A. OLSSON.
Thill-Coupling.

No. 159,348.  Patented Feb. 2, 1875.

WITNESSES:
A. W. Almqvist
A. F. Terry

INVENTOR:
Axel Olsson
BY Munn H
ATTORNEYS.

UNITED STATES PATENT OFFICE.

AXEL OLSSON, OF WILLIAMSBURG, NEW YORK, ASSIGNOR TO HIMSELF, J. W. COE, AND D. MERRITT, OF SAME PLACE.

IMPROVEMENT IN THILL-COUPLINGS.

Specification forming part of Letters Patent No. 159,348, dated February 2, 1875; application filed January 4, 1875.

*To all whom it may concern:*

Figure 1:
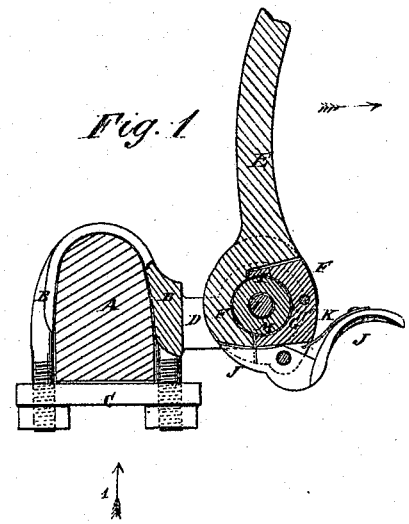
Figure 2:
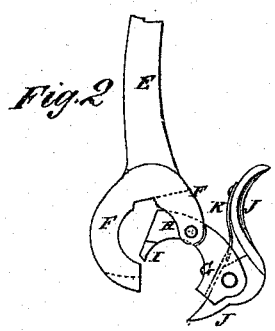
Figure 4:
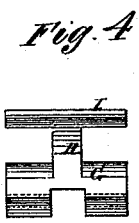
Figure 3:
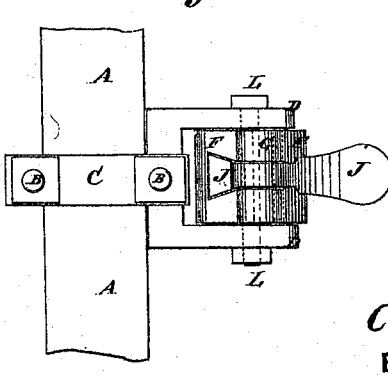

Be it known that I, AXEL OLSSON, of Williamsburg, in the county of Kings and State of New York, have invented a new and useful Improvement in Self-Locking Thill-Coupling, of which the following is a specification:

Figure 1 is a detail section of my improved thill-coupling. Fig. 2 is a detail side view of the same detached. Fig. 3 is an under-side view of the same. Fig. 4 is a detail view of the locking-lever.

Similar letters of reference indicate corresponding parts.

My invention has for its object to furnish an improved thill-coupling, which shall be so constructed as to lock itself when forced into place upon the coupling-bolt, which may be instantly detached, and which shall be simple in construction, strong, durable, and not liable to become accidentally detached. The invention consists in the combination of the pivoted and concave cross-head lever with the open and grooved eye of the thill-iron, to adapt it to operate in connection with the coupling-bolt, as hereinafter fully described; and in the combination of the pivoted thumb-lever and its spring with the pivoted cross-head lever and the notched open eye of the thill-iron.

A represents an axle. B represents the axle-clip, C the yoke, and D the lugs, with which the thill-iron is connected. E is the thill-iron, upon the end of which is formed an eye or socket, F, to receive the coupling-bolt. The eye F has an opening formed in its lower forward side, of such a size as to allow the said eye to be placed upon and removed from the coupling-bolt freely. To the eye F, at the forward side of its opening, is hinged a piece, G, of such a size as to fill the opening in the said eye F. Upon the hinged edge of the piece G is formed an arm, H, which fits into a groove or notch in the eye F, is curved so that its inner surface may coincide with the inner surface of the eye F, and has a cross-head, I, formed upon its inner end, which cross-head fits into a transverse groove in the eye F, at the upper side of its cavity. The inner surface of the cross-head I is concaved to correspond with the inner surface of the eye F. With this construction, when the coupling is forced upon the coupling-bolt the pressure of the said bolt upon the cross-head I forces the said cross-head into its groove, and closes the piece G H I down upon the said bolt, the piece G H I thus operating as a pivoted lever. The piece G H I, when forced down upon the coupling-bolt, is locked in place by the thumb-lever J, which is pivoted to the outer edge of the piece G. The forward end of the thumb-lever J is made dovetailed in shape, and fits into a dovetailed notch in the outer side of the lower rear part of the eye F. The outer end of the thumb-lever J is curved into trigger form, for convenience in operating it, and is held out to prevent the forward end of said lever from being jarred out of place by a spring, K, attached to the piece G, and which presses against the said outer part, as shown in Figs. 1 and 2.

By this construction, by pulling upon the outer part of the thumb-lever J, it will be unlocked, and the cross-head I will be forced against the coupling-bolt, throwing the eye F off said bolt.

L is the coupling-bolt, which passes through the holes in the lugs D, and is secured in place by a nut or other convenient means. The bolt L between the lugs D has a rubber tube, M, forced upon it to prevent rattling, and hold the various parts of the coupling securely in place.

Having thus described my invention, what I claim as new, and desire to secure by Letters Patent, is—

1. The combination of pivoted and concave cross-head lever G H I, open and grooved eye F, thill-iron E, and coupling-bolt L, substantially as set forth.

2. The combination of pivoted thumb-lever J, spring K, pivoted cross-head lever G H I, notched open eye F, and thill-iron E, substantially as set forth.

AXEL OLSSON.

Witnesses:
JOHN W. COE,
D. STRONG.